United States Patent [19]
Yagasaki et al.

[11] Patent Number: 5,298,991
[45] Date of Patent: Mar. 29, 1994

[54] VARIABLE LENGTH CODING APPARATUS AND METHOD FOR MOTION VECTOR

[75] Inventors: Yoichi Yagasaki; Jun Yonemitsu, both of Kanagawa; Veltman Mark; Kaisuji Igarashi, both of Tokyo, all of Japan

[73] Assignee: Sony Corporation, Tokyo, Japan

[21] Appl. No.: 918,010

[22] Filed: Jul. 24, 1992

[30] Foreign Application Priority Data

Aug. 3, 1991 [JP] Japan .................................. 3-194576

[51] Int. Cl.⁵ ............................................. H04N 7/157
[52] U.S. Cl. ...................................... 348/416; 341/67; 341/106; 375/27
[58] Field of Search ................... 358/105, 136; 375/27; 341/67, 106; H04N 7/137

[56] References Cited

U.S. PATENT DOCUMENTS

| | | | |
|---|---|---|---|
| 4,995,059 | 2/1991 | Ishikawa | 375/27 |
| 5,006,929 | 4/1991 | Barbero | 358/105 |
| 5,111,294 | 5/1992 | Asai | 358/136 |

Primary Examiner—Howard W. Britton
Attorney, Agent, or Firm—William S. Frommer; Alvin Sinderbrand

[57] ABSTRACT

A ROM containing a variable length coding table for a 2 picture element range is provided. A motion vector within the range of 2 picture elements is provided to the ROM to produce a VLC code corresponding to the motion vector within the range of 2 picture elements. In a calculation circuit, assuming that the value of a motion vector within the range of 4 picture elements is X, a quotient Y and a remainder Z are obtained by the division of X by 2. The quotient Y is supplied to the ROM and the output of the ROM is added the remainder Z at an addition circuit to obtain a VLC code corresponding to the motion vector lying within the range of 4 picture elements. This is equivalent to variable length coding for a 4 picture element range. By transmitting a flag indicating whether the motion vector range is 2 picture elements or 4 picture elements, the motion vector is correctly reproduced from the VLC code. Accordingly motion vectors within the ranges of 2 picture elements and 4 picture elements can be coded using a single ROM table so that the hardware requirements are reduced.

10 Claims, 8 Drawing Sheets

Fig. 1A
(PRIOR ART)

OBJECTIVE BLOCK

Fig. 1B
(PRIOR ART)

MOTION VECTOR

TABLE (REFERENCE TABLE) FOR THE RANGE OF ± 2 PICTURE ELEMENTS (1 PICTURE ELEMENT ACCURACY)

| VALUE OF A MOTION VECTOR | VLC CODE |
|---|---|
| −2 | 0 0 1 1 |
| −1 | 0 1 1 |
| 0 | 1 |
| 1 | 0 1 0 |
| 2 | 0 0 1 0 |

Fig. 4

TABLE FOR THE RANGE OF ± 4 PICTURE ELEMENTS (1 PICTURE ELEMENT ACCURACY)

| VALUE OF A MOTION VECTOR | VLC CODE | |
|---|---|---|
| −4 | 0 0 1 1 | 0 |
| −3 | 0 0 1 1 | 1 |
| −2 | 0 1 1 | 0 |
| −1 | 0 1 1 | 1 |
| 0 | 1 | 0 |
| 1 | 1 | 1 |
| 2 | 0 1 0 | 0 |
| 3 | 0 1 0 | 1 |
| 4 | 0 0 1 0 | 0 |

TABLE FOR THE RANGE OF ± 2 PICTURE
ELEMENTS (0.5 PICTURE ELEMENT ACCURACY)

| VALUE OF A MOTION VECTOR | VLC CODE |
|---|---|
| −2.0 | 0 0 1 1 0 |
| −1.5 | 0 0 1 1 1 |
| −1.0 | 0 1 1 0 |
| −0.5 | 0 1 1 1 |
| 0 | 1 0 |
| 0.5 | 1 1 |
| 1.0 | 0 1 0 0 |
| 1.5 | 0 1 0 1 |
| 2.0 | 0 0 1 0 0 |

Fig. 8

TABLE FOR THE RANGE OF ± 7 PICTURE ELEMENTS (DPCM)

| VALUE | VLC CODE |
|---|---|
| −8 or 8 | 0000 0101 11 |
| −7 or 9 | 0000 0111 |
| −6 or 10 | 0000 1001 |
| −5 or 11 | 0000 1011 |
| −4 or 12 | 0000 111 |
| −3 or 13 | 0001 1 |
| −2 or 14 | 0011 |
| −1 | 011 |
| 0 | 1 |
| 1 | 010 |
| 2 or −14 | 0010 |
| 3 or −13 | 0001 0 |
| 4 or −12 | 0000 110 |
| 5 or −11 | 0000 1010 |
| 6 or −10 | 0000 1000 |
| 7 or −9 | 0000 0110 |

Fig. 9

TABLE FOR THE RANGE OF ± 3 PICTURE ELEMENTS (DPCM)

| VALUE | VLC CODE |
|---|---|
| −4 or 4 | 0000 111 |
| −3 or 5 | 0001 1 |
| −2 or 6 | 0011 1 |
| −1 | 011 |
| 0 | 1 |
| 1 | 010 |
| 2 or −6 | 0010 |
| 3 or −5 | 0001 0 |

VARIABLE LENGTH CODING APPARATUS AND METHOD FOR MOTION VECTOR

BACKGROUND OF THE INVENTION

1. Field of the Invention

The invention relates to a variable length coding apparatus and method for motion vectors to be used in highly efficient coding of a moving picture signal, on the basis, for example, of interframe correlation.

2. Description of the Prior Art

When coding which utilizes interframe correlation is performed in connection with highly efficient coding of a moving picture signal, differences between frames are coded and, a motion vector is used to account for movement between two frames.

Figure 1A:
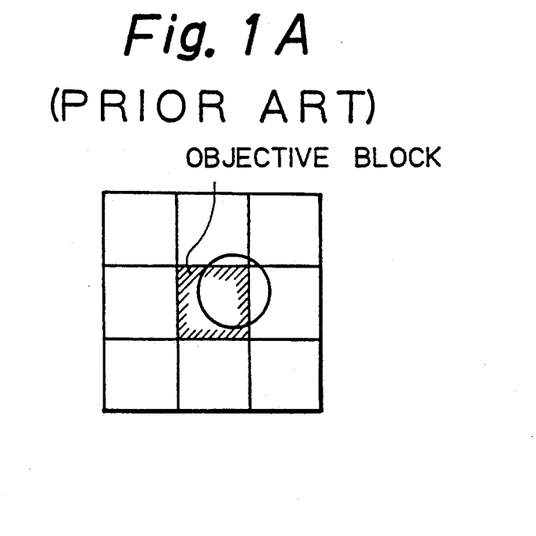
FIGS. 1A and 1B are diagrams illustrating the concept of a motion vector.
Figure 1B:
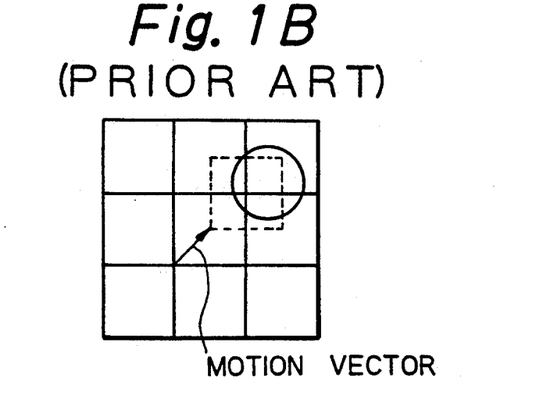

More specifically, a picture is divided into blocks of a predetermined size (for example, 16×16 picture elements as shown in FIG. 1A) and a motion vector indicates that a certain block the (objective block 11) has moved to another position on a second picture from which a difference is taken (as shown in FIG. 1B).

When a difference is taken between two frames after adjusting the second frame on the basis of a motion vector, the difference is minimized so that highly efficient coding can be performed. Conversely speaking, if the motion vector is obtained so that the difference between frames is minimized again highly efficient coding is made possible.

Figure 2:
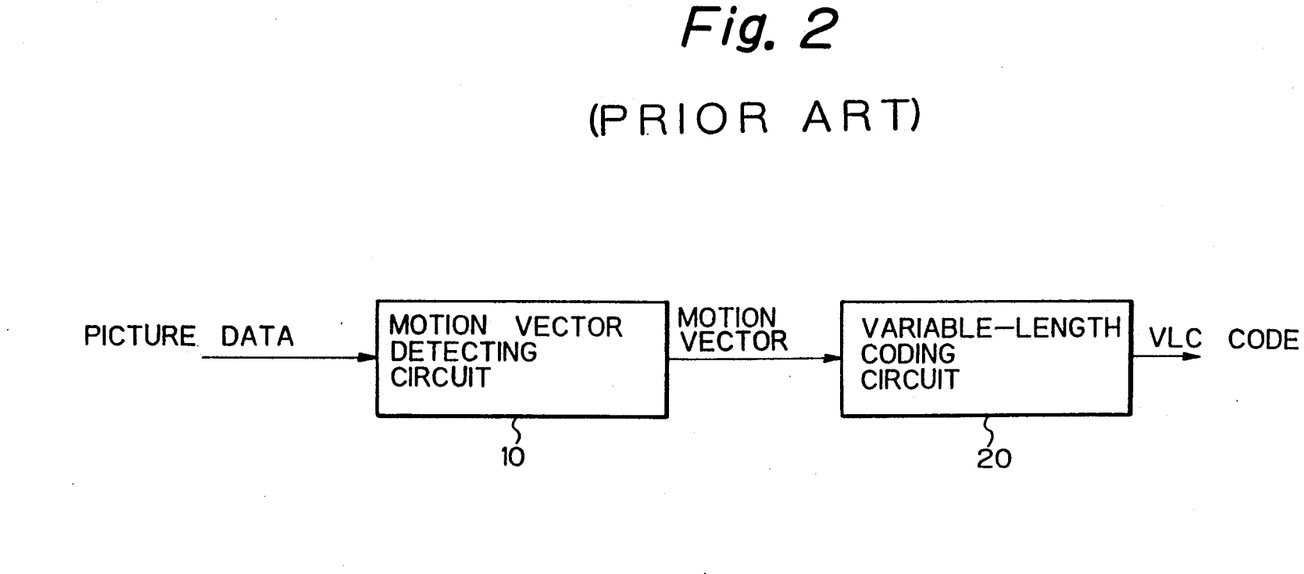
FIG. 2 is a block diagram of a circuit for motion vector detection and coding.

It is known to improve transmission efficiency of the motion vector, by using variable length coding of the motion vector. In particular, as shown in FIG. 2, picture data is supplied to a motion vector detecting circuit 10 which detects a motion vector, and the motion vector is then provided to a variable length coding circuit 20 and coded to provide a variable length coding code (VLC code).

Although the permissible range and degree of accuracy for the motion vector are theoretically unrestricted, and there are in fact practical limit such as hardware size, etc,. For example, consider the case in which variable length coding is to be performed the range of permissible range of the motion vector may be either ±7, picture elements or ±15 picture elements from the origin (i.e., the center), and the degree of accuracy may be 1 picture element unit or 0.5 picture element unit.

In this case two different variable length coding tables are needed for the 1 picture element degree of accuracy. That is, the table for the range of ±7 picture elements with 1 picture element accuracy has 15 elements 7, 6, ..., 0, ..., −6, −7, while the table for the range of ±15 picture elements with the same degree of accuracy has 31 elements 15, 14, ..., 0, ..., −14, −15. In addition, a table for the range of ±7 picture elements with 0.5 picture element which has 29 elements 7.0, 6.5, ..., 0, ..., −6.5, −7.0.

Accordingly, when there are plural kinds of motion vector ranges and there are plural degrees of accuracy, the number of tables that are needed increases, leading to more onerous hardware requirements.

OBJECTS AND SUMMARY OF THE INVENTION

An object of this invention is, therefore, to provide a variable length coding apparatus and method for motion vectors which can reduce the load imposed on the hardware when there are plural kinds of motion vector ranges and degrees of accuracy.

According to an aspect of the invention, there is provided a variable length coding apparatus for coding a motion vector comprising:

a motion vector detecting circuit, supplied with an input picture data, for detecting a motion vector; and a variable length coding circuit for coding the motion vector and for outputting a VLC code, the variable length coding circuit comprising:

a memory circuit for storing a reference variable length coding table;

a control section for changing a method of accessing the variable length coding table in accordance with reference information of concerning the motion vector; and a variable length coding section for performing variable length coding corresponding to plural different kinds of reference information concerning the motion vector under the control of the control section.

According to another aspect of the invention, there is provided a variable length coding method for coding a motion vector comprising the steps of:

receiving an input picture data and detecting a motion vector; and changing a method of accessing a reference variable length coding table stored in a memory circuit in accordance with reference information of concerning the motion vector and performing variable length coding corresponding to plural different kinds of reference information.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

An embodiment of the invention will now be described reference to the drawings. In this embodiment, variable length coding is performed for a motion vector within the range of ±2 picture elements with 1 picture element accuracy and a motion vector within the range of ±4 picture elements with 1 picture element accuracy.

Figure 3:
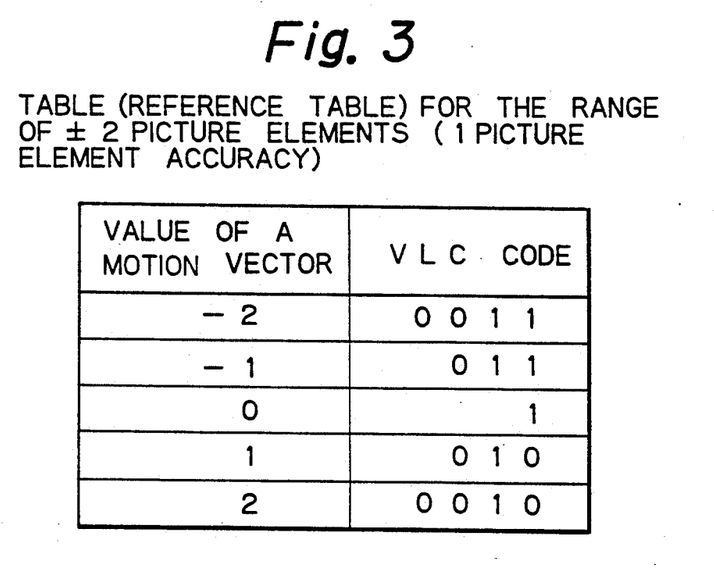
FIG. 3 is a diagram showing one example of a variable length coding table.

FIG. 3 indicates a variable length coding table for range of ±2 picture elements with the 1 picture element accuracy (the table associates each possible value of the motion vector with a VLC code value). The table has 5 elements 2, 1, 0, −1, and −2.

According to the invention, variable length coding of a motion vector lying within the range of ±4 picture elements is performed based on the variable length coding table for ±2 picture element range.

First, assuming that the value of a motion vector is X, a quotient Y and a remainder Z are obtained by the division of X by two.

$$X = 2 \cdot Y + Z \tag{1}$$

Figure 4:
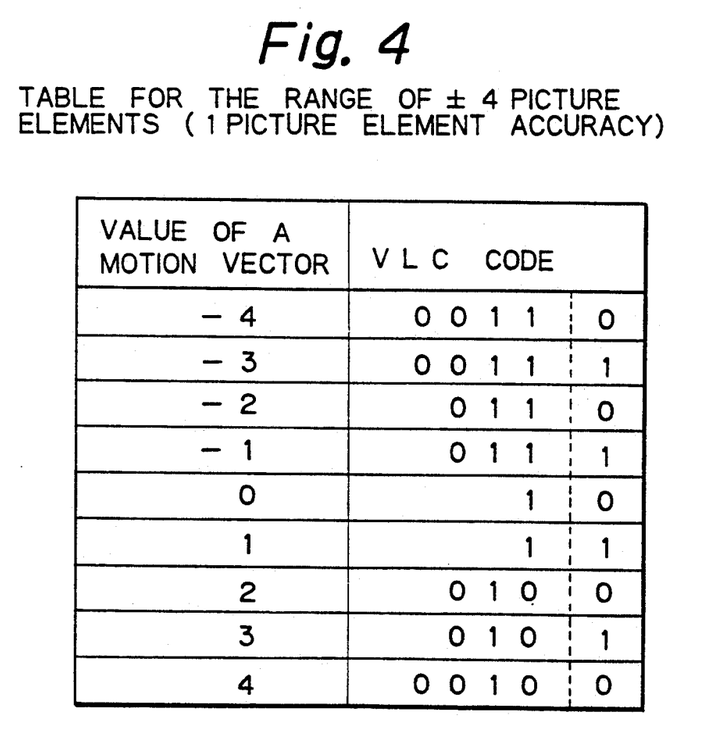
FIG. 4 is a diagram showing another example of a variable length coding table.

Next, a VLC code is provided by adding a remainder Z as an additional bit to a VLC code (coded using the table of FIG. 3) corresponding to the quotient Y. As a result, this is equivalent to coding with 1 picture element accuracy using a variable length coding table for ±4 picture element range as shown in FIG. 4 which is consequently an expansion of the variable length table shown in FIG. 3. The variable length coding table of FIG. 4 has nine elements 4, 3, ..., 0, ..., −3, −4.

On the other hand, for the coding of a motion vector within the range of ±2 picture elements with 1 picture element accuracy, a VLC code corresponding to the motion vector X is directly obtained using the variable length coding table shown in FIG. 3.

Thus, on the basis of the variable length coding table for the range of ±2 picture elements with 1 picture element accuracy, both the coding of a motion vector within the range of ±2 picture elements with 1 picture element accuracy as well as the coding of a motion vector within the range of ±4 picture elements with 1 picture element accuracy can be performed.

A coded motion vector can be reproduced correctly on the decoder side using an operation that is the reverse of the operation described above, by transmitting a flag indicative of whether the motion vector is within the range of ±2 picture elements or within the range of ±4 picture elements.

Figure 5:
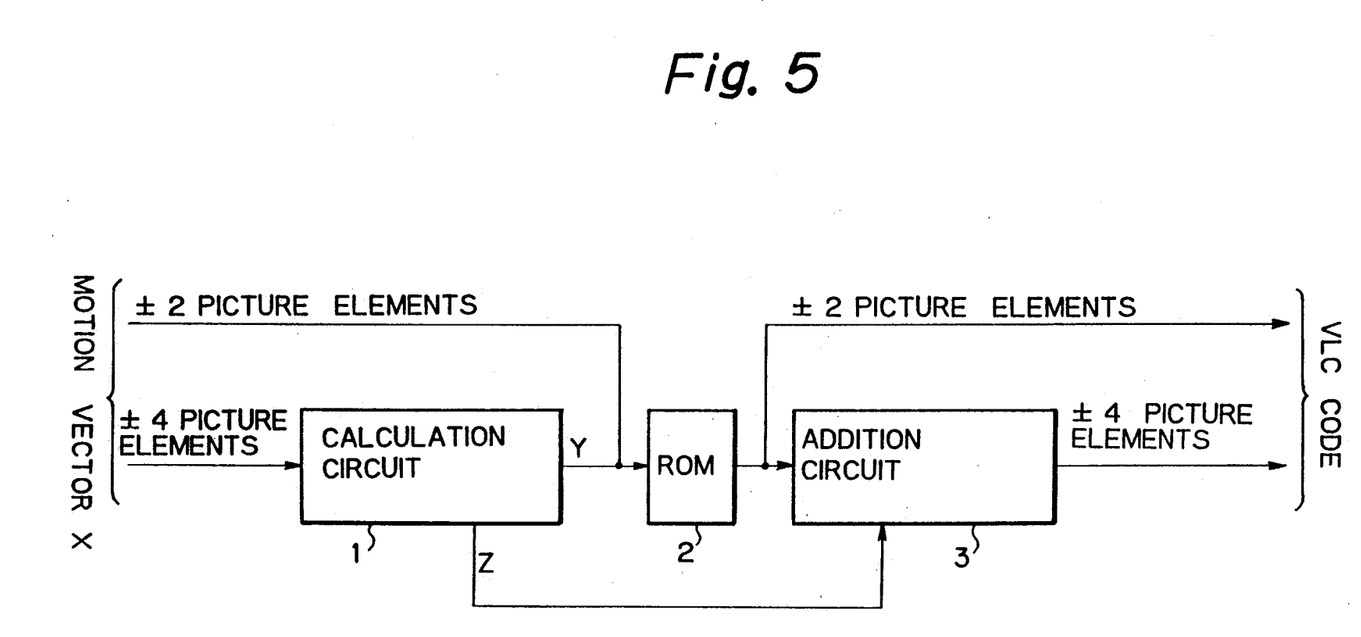
FIG. 5 is a block diagram of an embodiment of a motion vector coding circuit according to the invention.

FIG. 5 is an example of a circuit for coding a motion vector within the range of ±2 picture elements with 1 picture element accuracy and for coding of a motion vector within the range of ±4 picture elements with 1 picture element accuracy on the basis of a variable length coding table for the ±2 picture elements range with 1 picture element accuracy.

In FIG. 5, reference numeral 1 denotes a calculation circuit to which a motion vector within the range ±4 picture elements is supplied. At the calculation circuit 1, the above-mentioned calculation of equation (1) is performed so that a quotient Y and a remainder Z are produced.

Reference numeral 2 indicates a ROM, which contains a variable length coding table shown in FIG. 3. The ROM 2 is directly supplied with the motion vector as an address signal when the motion vector lies within the range of ±2 picture elements, but ROM 2 is supplied with the quotient Y which is produced from the calculation circuit 1 when the motion vector lies with the range of ±4 picture elements.

When the motion vector is within the range of ±2 picture elements, the output of the ROM 2 is produced as a VLC code. Meanwhile, in the case where the motion vector lies in the range of ±4 picture elements, the addition circuit 3 adds the remainder Z output from the calculation circuit 1 as an additional bit to the output of the ROM 2 to provide a VLC code.

Thus, according to this example, the coding of the motion vector within the range of ±2 picture elements with 1 picture element accuracy coding that of the motion vector within the range of ±4 picture elements with 1 picture element accuracy are both performed using the same variable length coding table (ROM 2) so that the hardware burden is reduced.

Figure 6:
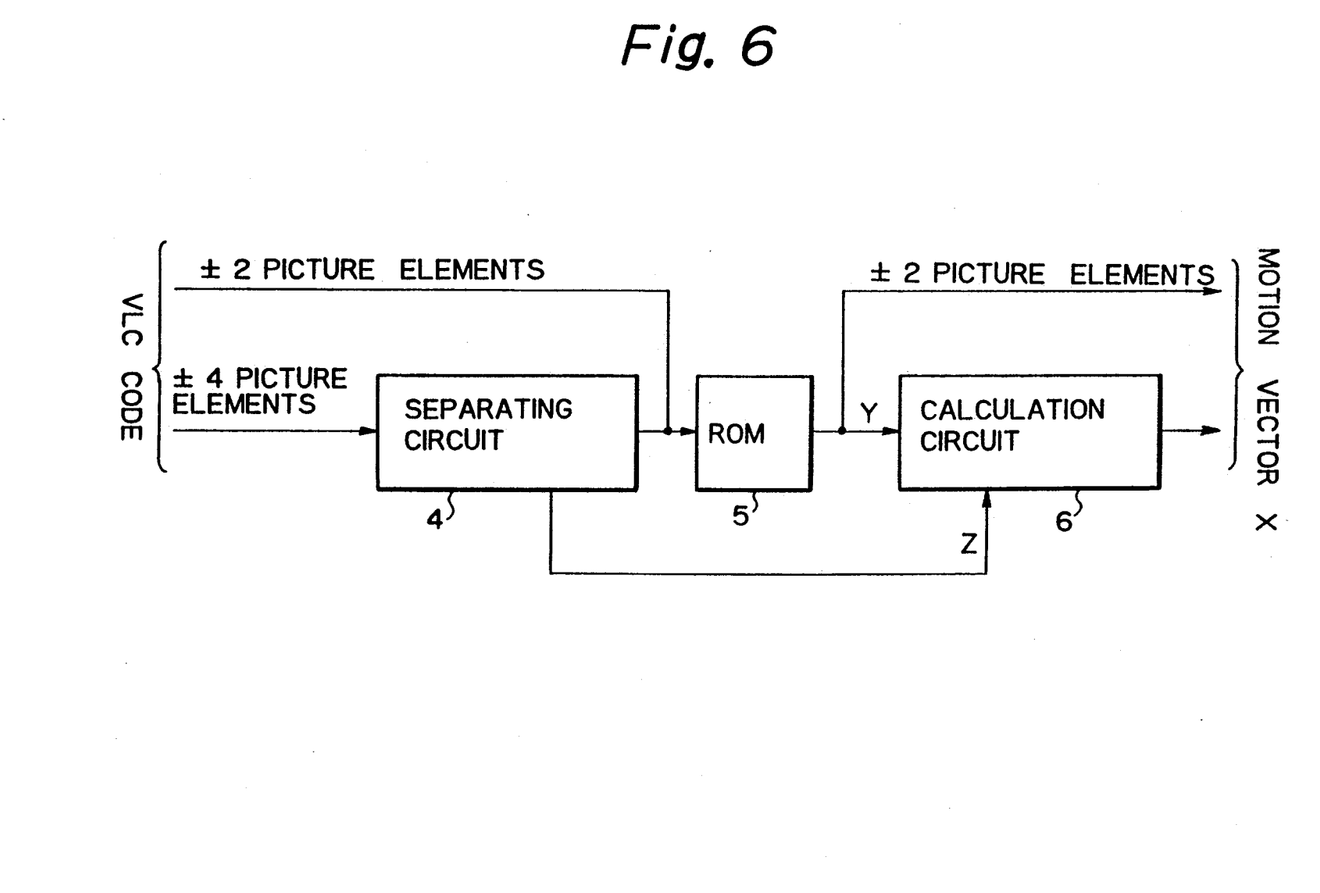
FIG. 6 is a block diagram of an embodiment of a motion vector decoding circuit according to the invention.

FIG. 6 shows a decoding circuit corresponding to the coding circuit shown in FIG. 5. It is determined based on a flag sent with a VLC code whether the VLC code relates to a motion vector within the range of ±2 picture elements or a motion vector within the range of ±4 picture elements.

In FIG. 6, reference numeral 4 denotes a separating circuit, which is supplied with a VLC code relating to a motion vector within the range of ±4 picture elements. The separation into an additional bit (remainder Z) and the other bits is carried out at the separating circuit 4.

Also, reference numeral 5 indicates a ROM, which contains a conversion table which is the reverse of the variable length coding table of FIG. 3. A VLC code is directly supplied as an address to the ROM 5 when the VLC code relates to a motion vector lying within the range of ±2 picture elements. On the other hand, when the VLC code relates to a motion vector lying within the range of ±4 picture elements, bits other than the additional bit separated at the separating circuit 4 are supplied as an address to the ROM 5.

In the case where the VLC code relates to a motion vector lying within the range of ±2 picture elements, the output of the ROM 5 is produced as a motion vector. Meanwhile, when the VLC code relates to a motion vector lying within the range of ±4 picture element, the output of the calculation circuit 6 is produced as a motion vector. As a result, by the use of equation (1), X is obtained in the calculation circuit 6 from the output Y of the ROM 5 and an additional bit Z separated at the separating circuit 4.

There will be described examples of coding of a motion vector within the range of ±2 picture elements with 1 picture element accuracy and coding of a motion vector within the range of ±2 picture elements with 0.5 picture element accuracy.

The coding of a motion vector within the range of ±2 picture elements with 0.5 picture element accuracy is done based on the variable length coding table shown in FIG. 3.

First, assuming that the value of a motion vector is X, a quotient Y and a remainder Z are provided by the division of 2X by 2.

$$2 \cdot X = 2 \cdot Y + Z \tag{2}$$

Now, assuming that Y, Z are integers, Y is the integer part of X. Meanwhile, Z is "0" or "1" which is equal to twice the fractional part of X.

Figure 7:
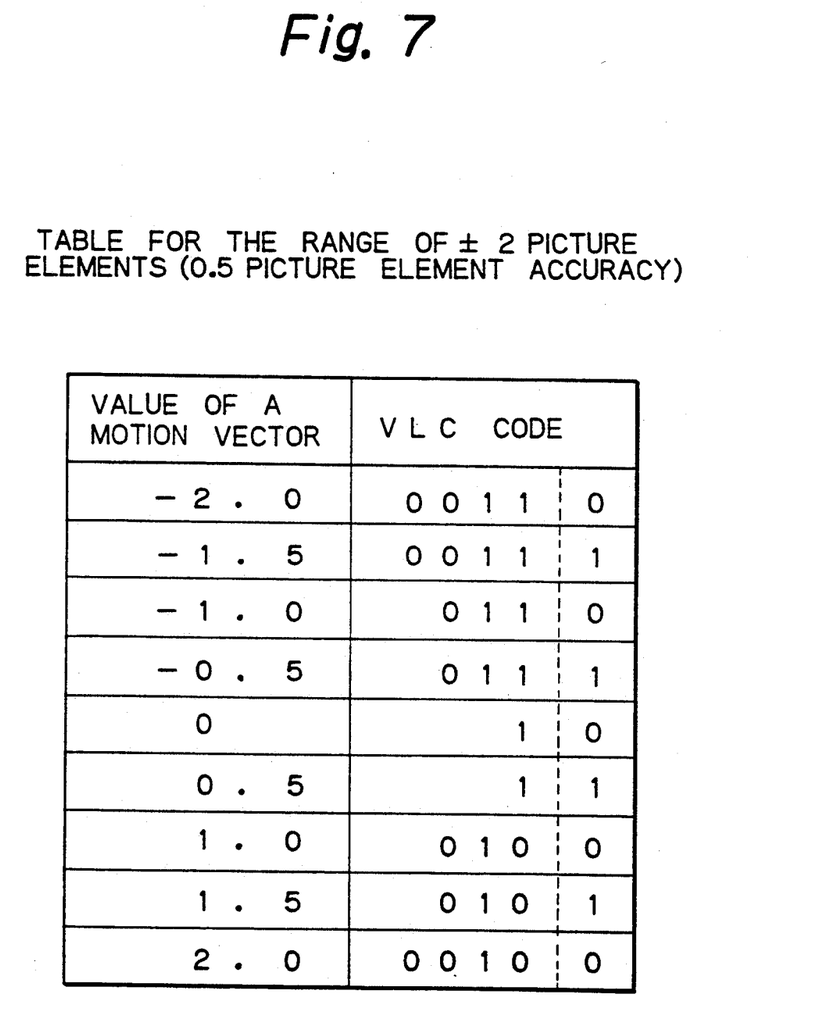
FIG. 7 is a diagram showing still another example of a variable length coding table.

Next, a VLC code is provided by adding a remainder Z as an additional bit to a VLC code (coded using the table of FIG. 3) corresponding to the quotient Y. Consequently, this is equivalent to coding with 0.5 picture element accuracy using variable length coding for ±2 picture element range as shown in FIG. 7 and represent an expansion of the variable length coding table shown in FIG. 3. The variable length coding table of FIG. 7 has nine elements 2.0, 1.5, ..., 0, ..., −1.5, −2.0.

Meanwhile, for the coding of a motion vector within the range of ±2 picture elements with 1 picture element accuracy, a VLC code corresponding to a motion vector X is directly obtained using the variable length coding table shown in FIG. 3.

As a result, on the basis of the variable length coding table for the range of ±2 picture elements with 1 picture element accuracy, there can be performed not only the coding of a motion vector within the range of ±2 picture elements with 1 picture element accuracy but also the coding of a motion vector within the range of ±2 picture elements with 0.5 picture element accuracy.

As stated above, a coded motion vector can be reproduced accurately on the decoder side with an operation that is the reverse of the operation just described by transmitting a flag indicating whether the motion vector is within 1 picture element accuracy or within 0.5 picture element accuracy.

Based on the variable length coding table for the range of ±2 picture elements with 1 picture element accuracy, circuits for coding and decoding a motion vector within the range of ±2 picture elements with 1 picture element accuracy and a motion vector within the range of ±2 picture elements with 0.5 picture element accuracy can be provided that are similar to the circuits of FIGS. 5 and 6. The coding can be performed using one variable length coding table (ROM 2) so that hardware requirements are reduced.

Next, there will be considered the case where a motion vector is subjected to DPCM (Differential PCM) so that only a difference with respect to a motion vector for an adjacent block is transmitted.

For instance, when the value of a motion vector of a certain block is 4, 4−3=1 is provided if the value of next motion vector is 3. In this case, only the value 1 of the difference is transmitted. In this way, since the transmitted VLC code is shorter than a VLC code corresponding to 4, the transmission is performed more efficiently.

Figure 8:
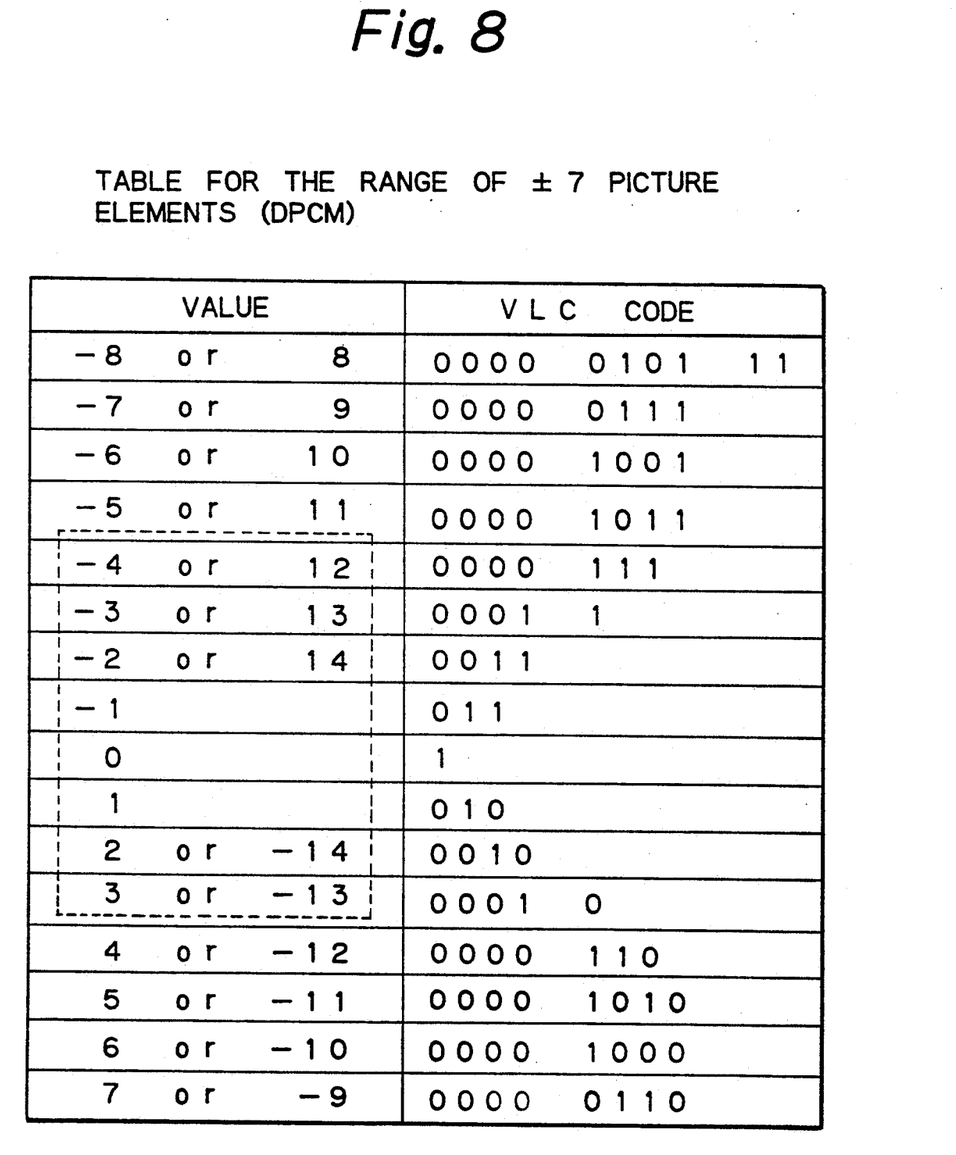
FIG. 8 is a diagram showing a further example of a variable length coding table.
Figure 9:
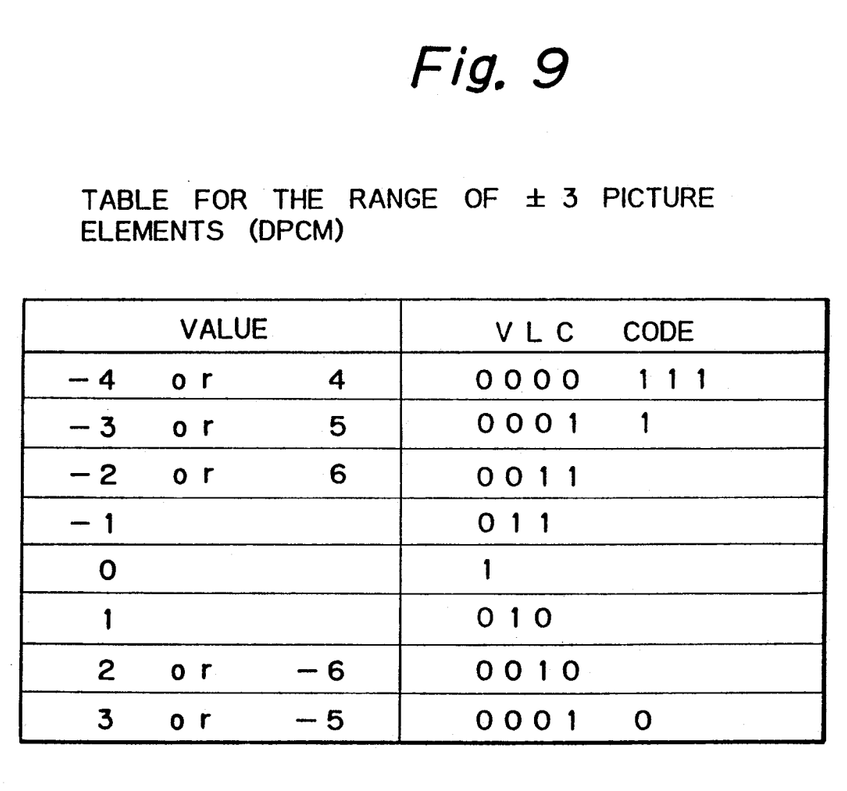
FIG. 9 is a diagram showing yet another example of a variable length coding table.

Now, in the DPCM coding of a motion vector, there is a method which is called the reflected DPCM method. In this method, the range of the DPCM value is determined like a motion vector. For example, two values are allotted to one VLC code as shown in FIGS. 8 and 9. FIGS. 8 and 9 are respectively variable length coding tables for DPCM transmission of motion vectors lying within the range of ±7 picture elements with 1 picture element accuracy and ±3 picture elements with 1 picture element accuracy.

In FIG. 9, since the motion vector range is ±3 picture elements, the result of DPCM is ±6. For example, assuming that the value of a previous motion vector is 3 and that the value of a present motion vector is 1, 3−1=2 is the resulting DPCM value. Consequently, the VLC code is "0010".

Considering reproduction of a motion vector after the transmission of this code, the VLC code is "0010", so that the DPCM value is 2 or −6. At this time, since the decoder side knows that the value of the previous motion vector is 3, the value of the motion vector either 3−2=1 or 3−(−6)=9. But, because the motion vector lies in the range of ±3 picture elements, the motion vector cannot be 9 and therefore must be 1.

In the above-described reflected DPCM method, a table proportional to the range of the motion vectors is necessary. For this reason, if the DPCM variable length coding is performed for motion vector ranges of ±7 picture elements and ±3 picture elements, for example, the variable length coding tables shown in FIGS. 8 and 9 may be provided. According to another method, only the variable length coding table shown in FIG. 8 is provided so that the DPCM values ±6 corresponding to motion vectors within the range of ±3 picture elements are variable length coded using the table shown in FIG. 8.

In the former method, since two tables are needed, the load imposed on the hardware is great. On the other hand, in the latter method, there is a high probability that a longer code will be generated using the table of FIG. 8 as compared with that of FIG. 9 so that transmission efficiency is reduced.

To eliminate these disadvantages, a flag indicative of the range of a motion vector is provided as in the above-mentioned embodiment. For variable length coding the motion vector, only the table shown in FIG. 8 is provided. In this case, if the range of the motion vector is ±7 picture elements, the coding is performed using the entire table. However, if the range is ±3 picture elements, the portion within the broken lines is replaced by the table shown in FIG. 9.

By transmitting a flag indicating the motion vector range together with a VLC code formed in this way, the motion vector is correctly reproduced by providing a reference table as shown in FIG. 8 on the decoder side and the replacement of performing the decoding with a portion of the table of FIG. 8 with the table of FIG. 9 only when the flag indicates that the motion vector range is ±3 picture elements.

In this manner, by partially replacing the reference table, the hardware requirements can be reduced as compared with the case in which plural tables are provided.

According to the invention, a single reference variable length coding table is sufficient for coding plural kinds of motion vector ranges and accuracies so that the hardware requirements are reduced. Also, since the invention can be adapted to a motion vector having a broad range by expanding the reference table and to can also be used for a motion vector having a narrow range, increased flexibility is provided. Further, the accuracy of the motion vector range can be improved by expanding the reference table.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A variable length coding apparatus for coding a motion vector comprising:
   a motion vector detecting circuit, supplied with input picture data for a plurality of frames, for detecting a motion vector representing movement between two of said frames; and
   a variable length coding circuit for coding said motion vector and for outputting a VLC code,
   said variable length coding circuit comprising:
   a memory circuit for storing a reference variable length coding table;
   a control section for changing a method of accessing said variable length coding table in accordance with reference information concerning said motion vector; and a variable length coding section for performing variable length coding corresponding to plural different kinds of said reference information concerning said motion vector under the control of said control section.

2. A variable length coding apparatus according to claim 1, wherein said reference information comprises the range and accuracy of said motion vector.

3. A variable length coding apparatus according to claim 1, wherein said control section performs one of expansion of said variable length coding table and replacement of part of said table in connection with changing said method of accessing said table.

4. A variable length coding apparatus according to claim 1, wherein:
said motion vector is within one of a first picture element range and a second picture element range which is larger than the first picture element range;
said control section comprises a calculation circuit; and
said control section outputs a control signal when said motion vector is within the second picture element range.

5. A variable length coding apparatus according to claim 4, wherein said memory circuit comprises a ROM and is directly supplied with said motion vector as an address when said motion vector is within said first picture element range and is supplied with said control signal as an address when said motion vector is within said second picture element range.

6. A variable length coding apparatus according to claim 5, wherein said calculation circuit outputs a quotient and a remainder which are obtained by the division of the value of said motion vector by two, and said control signal is data representing the quotient.

7. A variable length coding apparatus according to claim 1, wherein said memory circuit stores a variable length coding table for the range of ±2 picture elements with 1 picture element accuracy, and wherein said variable length coding section codes a motion vector within the range of ±2 picture elements with 1 picture element accuracy and a motion vector within the range of ±4 picture elements with 1 picture element accuracy on the basis of the variable length coding table.

8. A variable length coding apparatus according to claim 1, wherein said variable length coding table is formed on the basis of differential PCM.

9. A variable length coding method for coding a motion vector comprising the steps of:
receiving input picture data for a plurality of frames and detecting a motion vector representing movement between two of said frames;
changing a method of accessing a reference variable length coding table stored in a memory circuit in accordance with reference information concerning said motion vector, said reference information being one of plural different kinds of reference information; and
performing variable length coding corresponding to said one of said plural kinds of reference information.

10. A decoding circuit for decoding an input VLC code to obtain a motion vector which relates to one of a first picture element range and a second picture element range which is larger than the first picture element range, comprising:
a circuit for detecting said VLC code and a flag sent together with said VLC code and for determining whether said motion vector relates to the first picture element range or the second picture element range;
a memory circuit for storing a reference inverse conversion table for variable length decoding; and
a separating circuit;
wherein said VLC code is directly supplied to said memory circuit as an address and said motion vector is obtained as an output of said memory circuit when said VLC code represents a motion vector which relates to said first picture element range, and when said VLC code represents a motion vector which relates to said second picture element range, an additional bit is separated from said VLC code at said separating circuit and bits other than the additional bit separated at said separating circuit are supplied to said memory circuit as an address and said motion vector is obtained on the basis of an output of said memory circuit and the additional bit.

* * * * *

UNITED STATES PATENT AND TRADEMARK OFFICE
CERTIFICATE OF CORRECTION

PATENT NO. : 5,298,991
DATED : March 29, 1994
INVENTOR(S) : Yoichi Yagasaki et al.

It is certified that error appears in the above-identified patent and that said Letters Patent is hereby corrected as shown below:

Correct the cover sheet as follows:

Inventors:

Change "Veltman Mark" to -- Mark Veltman --;

Change "Kaisuji Igarashi" to -- Katsuji Igarashi --.

Signed and Sealed this

Second Day of August, 1994

Attest:

BRUCE LEHMAN

Attesting Officer    Commissioner of Patents and Trademarks